H. DALITZ.
TOURING MAP CARRIER FOR AUTOMOBILES.
APPLICATION FILED NOV. 17, 1908.
938,828.
Patented Nov. 2, 1909.
2 SHEETS—SHEET 1.
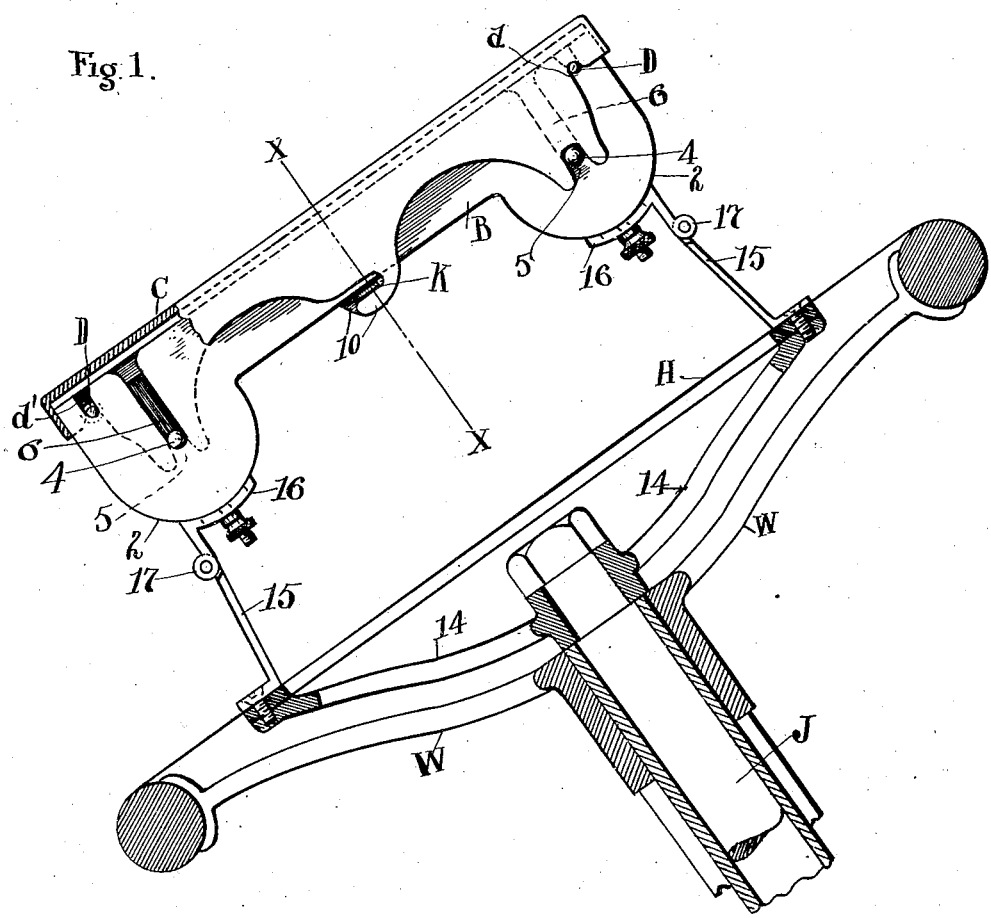
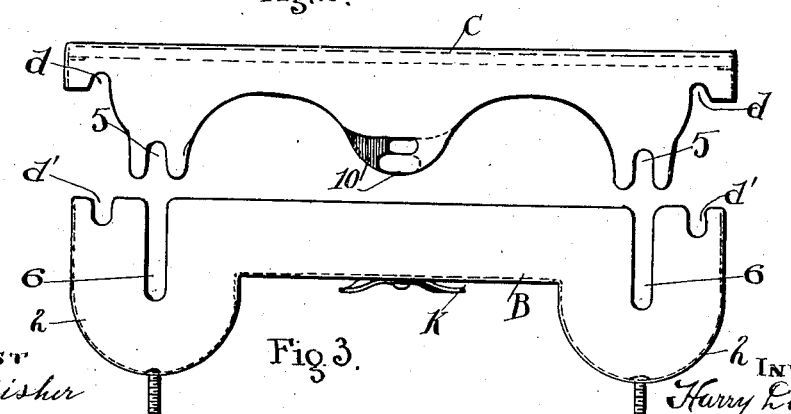

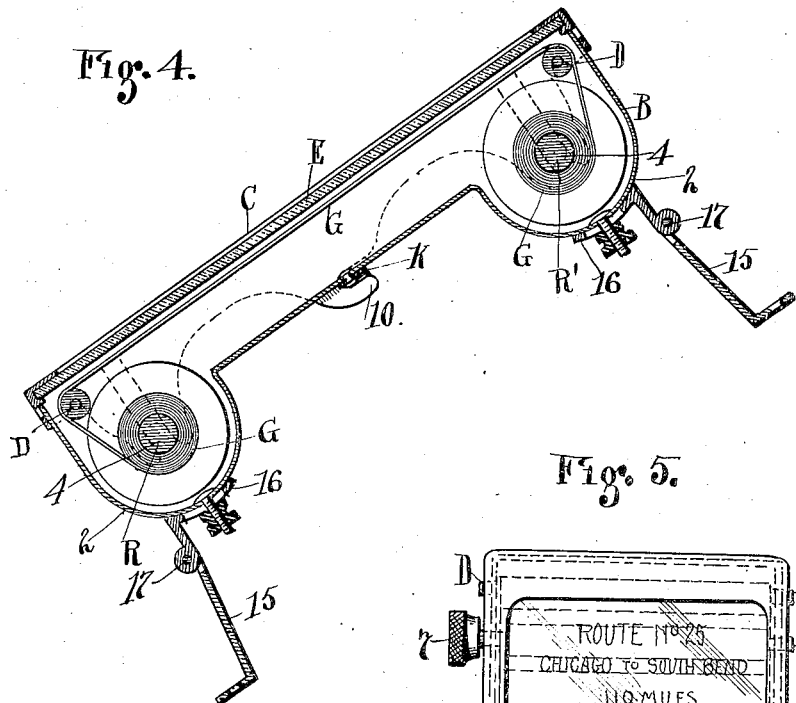
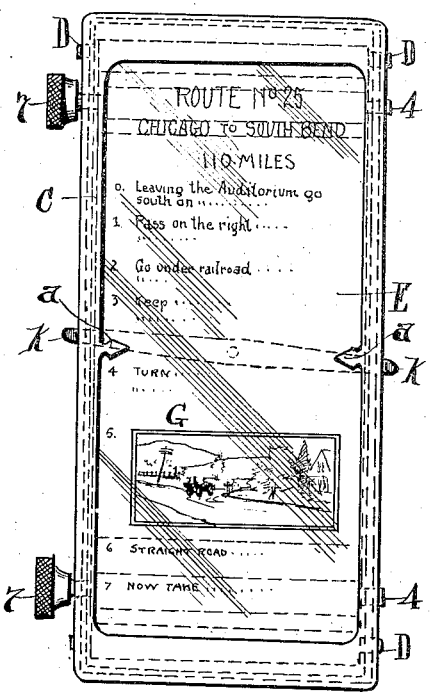
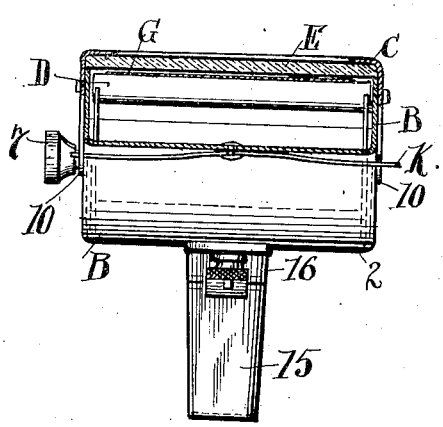

UNITED STATES PATENT OFFICE.

HARRY DALITZ, OF CLEVELAND, OHIO.

TOURING-MAP CARRIER FOR AUTOMOBILES.

938,828. Specification of Letters Patent. Patented Nov. 2, 1909.

Application filed November 17, 1908. Serial No. 463,120.

*To all whom it may concern:*

Be it known that I, HARRY DALITZ, a citizen of the United States, residing at Cleveland, in the county of Cuyahoga and State of Ohio, have invented certain new and useful Improvements in Touring-Map Carriers for Automobiles, and do declare that the following is a full, clear, and exact description of the invention, which will enable others skilled in the art to which it appertains to make and use the same.

My invention relates to a touring map carrier for automobiles, and the invention consists in a carrier adapted in its preferred arrangement to rest over or above the steering wheel, but it may be placed in any other available position for use personally by the chauffeur or by another person in the car, all substantially as shown and described and particularly pointed out in the claims.

In the accompanying drawings Figure 1 is a side elevation of the invention and a sectional elevation of a steering wheel over which the same is mounted. Figs. 2 and 3 are side elevations of the upper and lower parts or members of the casing in which the map is confined and operated, and Fig. 4 is a longitudinal sectional elevation of the device with all the parts in working position.
Fig. 5 is a plan view of the complete device showing the touring map therein, and Fig. 6 is a cross section of the device on a line corresponding to *x—x*, Fig. 1.

The views of the invention as thus shown and the description thereof clearly indicate the object and character of the invention, the same constituting a device adapted to provide automobile tourists with the essential details of a route consecutively as they are met in travel and so that the tourist may have all needed information with him on the car and in the order in which it may be needed progressively from end to end. Pointers *a* at the edge of the casing assist in finding each successive item as the route is run off, and the map is moved up correspondingly. By these means the driver is constantly assured as to where he is and what to look for or expect just ahead.
I am of course aware that in any broad sense it is not now new to have a touring map or guide for automobile uses in which the particulars about a route are set down in their order, but the present invention has to do more especially with the means to carry and operate the map than with the map itself as an article.

Hence the invention consists essentially in the mechanical device shown in the several views, or its equivalent, and comprises a casing consisting of two parts, a bottom or body part B and an upper or cover part C, adapted to be engaged upon or over said body and to close the same about its sides and ends relatively as shown so as to exclude rain or dust. The said body B is shown as provided with semi-cylindrical or trough shaped depressions 2 transversely at its ends to receive the respective spools R and R' which carry the map or guide sheet G, and upon which the said map or sheet is secured at its ends and adapted to wind in either direction as may be required. The said map is made of a length corresponding to the distance to be traveled and the items to be noted, and runs over sustaining rollers D at the ends of the casing engaged in slots *d* and *d'*. The said spools R and R' are mounted upon spindles 4, which are operatively engaged with the rolls and rest at their ends in the open slots 5 and 6 in the casing. Each spindle is provided with a milled or knurled head 7 adapted to be engaged by the fingers to rotate the spools and carry the map forward, and a glass or other transparent window E is set into cover C to disclose the map beneath the same. The said parts B and C of the casing are temporarily fastened together in working position by a spring keeper K pivoted to rotate horizontally on the bottom and middle of body B and having its extremities adapted to engage and lock in the substantially hook shaped horizontal projections 10 depending from the middle and side of the cover C. These projections 10 extend in opposite directions on the two sides, so that as the said keeper is rotated to locking position it will engage with both said projections at the same time. By giving the keeper K sufficient spring and strength it presses the cover C so closely upon the ends of spindles 4 that they are sufficiently tight to keep the map stretched over the rolls and upon the spools R and R'.

Now, having the said device as a whole constructed and arranged to be used and operated substantially as thus shown and described, I have found that the most convenient location thereof in the average large touring car is directly over the steering wheel W. This brings the hand and the eye operatively together and leaves the driver free for the necessary outlook while he is also in the most advantageous position to read the map and move it along to keep up with the route. Hence I have shown the device as mounted over the said wheel W, and upon the usual annulus or part H next above said wheel. Said annulus usually is fixed on the extremity of stationary rod J by some suitable means indicated in this instance by 14 or such as a given car may carry, and the steering wheel is rotatably sleeved upon this rod and has its operating connection thence as usual.

Now, assuming that the device is to be supported from or upon annulus H, it should be understood that said annulus, so-called, varies in size in different makes of touring cars, and hence in order that it may be used with equal facility on all such cars and sustain the same relative position on all, as well as to lift the device high enough above the steering wheel to permit other appliances to be placed on the same general support, I provide each end of the body B with adjustable legs or supports consisting each of two parts, 15 and 16 respectively. The part 15 is a rigid standard having a substantially right angled lower end bolted firmly to annulus H, and the part 16 has hinged or jointed connection at 17 with said standard and is curved in its upper portion to conform to the bottom of depression 2 and slotted lengthwise and secured to said depression by a bolt through said slot. With this construction of said parts I can fix the device rigidly and relatively the same way upon various sizes of annuli and have the legs sustain the right supporting position in each case.

It may be specifically noted that the respective slots 5 and 6 in the body and cover are not only coincident as to location but are of such depth that the spindles therein are frictionally engaged in the ends of said slots when cover C is clamped down on body B.

Any suitable rods or the like can be substituted for the rollers D if they serve to sustain and stretch or straighten the map over the same whether they roll or are stationary.

What I claim is:—

1. A tourist's map carrier for automobiles and like vehicles, comprising a body having trough shaped ends transversely with slots centrally therein open to the top of said body, and spools with spindles in said slots, in combination with a cover over said body provided with projections at its sides extending down over the upper portions of said slots and slotted at their extremities to engage over the ends of said spindles, said cover having downward projections centrally at its sides having horizontal open slots on a plane beneath said body and a locking device on the said body adapted to engage in said slots.

2. A casing for touring maps, in combination with standards therefor at its ends adjustable at their top on the bottom of said casing, a steering wheel supporting rod and an annulus fixed thereon against rotation and said standards fixed on said annulus.

3. A tourist's map carrier comprising a casing to carry a map having ends rounded at their bottom, a fixed support and standards for said casing fixed at their lower ends on said support and consisting in curved slotted top portions adjustably secured to the rounded portions of the bottom of said body and rigid lower portions hinged to said upper portions of the standards, whereby the casing is adapted to be fixed to supports of different sizes.

4. A casing adapted to carry a tourist's map on automobiles and the like and means to support the same comprising a fixed rod, a steering wheel rotatably mounted on said rod, an annulus rigidly fixed to the end of said rod above said wheel and relatively of smaller size than the wheel to leave room for the hands on the wheel, and standards supporting said casing from said annulus in a rearwardly inclined position, said standards having said casing adjustably fixed thereon.

In testimony whereof I sign this specification in the presence of two witnesses.

HARRY DALITZ.

Witnesses:
E. M. FISHER,
R. B. MOSER.